(12) United States Patent
Dierks et al.

(10) Patent No.: US 7,658,587 B1
(45) Date of Patent: *Feb. 9, 2010

(54) HYDRAULIC TAIL TRAILER

(75) Inventors: Dale Dierks, Mitchell, SD (US); A. Dean Oehlerking, Mitchell, SD (US); Ray Paradis, Mitchell, SD (US); Brent Hohman, Fulton, SD (US); Cynthia Bjerrum, Mitchell, SD (US); Don Huber, Alexandria, SD (US); Steve Koch, Mitchell, SD (US)

(73) Assignee: Dakota Manufacturing Co., Inc., Mitchell, SD (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/247,102

(22) Filed: Oct. 11, 2005

Related U.S. Application Data

(63) Continuation-in-part of application No. 11/179,684, filed on Jul. 11, 2005, now Pat. No. 7,547,178.

(51) Int. Cl.
*B60P 1/00* (2006.01)

(52) U.S. Cl. ............... 414/484; 414/480; 414/482; 414/537; 296/184.1; 280/790

(58) Field of Classification Search ........ 414/480, 414/482, 484, 537; 296/25, 184.1; 280/790; 14/71.3, 71.7
See application file for complete search history.

(56) References Cited

U.S. PATENT DOCUMENTS

| | | | | |
|---|---|---|---|---|
| 2,173,277 A | * | 9/1939 | Jarmin et al. | 414/482 |
| 3,064,842 A | * | 11/1962 | Haynie | 414/482 |
| 4,305,694 A | * | 12/1981 | Chan | 414/482 |
| 4,372,727 A | * | 2/1983 | Fredrickson et al. | 414/537 |
| 4,498,836 A | * | 2/1985 | Love | 414/537 |
| 4,568,235 A | * | 2/1986 | Bills, Jr. | 414/477 |
| 5,013,056 A | * | 5/1991 | Landoll et al. | 280/425.2 |
| 5,033,931 A | * | 7/1991 | Mann | 414/480 |
| 5,215,426 A | * | 6/1993 | Bills, Jr. | 414/537 |
| 5,234,308 A | * | 8/1993 | Mann | 414/480 |
| 5,490,754 A | * | 2/1996 | Voelzke | 414/537 |
| 5,667,231 A | * | 9/1997 | Dierks et al. | 280/149.2 |
| 6,161,997 A | * | 12/2000 | Furlong | 410/24 |
| 6,394,734 B1 | * | 5/2002 | Landoll et al. | 414/480 |
| 6,425,627 B1 | * | 7/2002 | Gee | 296/184.1 |

FOREIGN PATENT DOCUMENTS

GB  2186238 A  *  8/1987

* cited by examiner

*Primary Examiner*—Michael S Lowe
(74) *Attorney, Agent, or Firm*—Dennis L. Thomte; Thomte Patent Law Office LLC

(57) ABSTRACT

A hydraulic tail trailer comprising a main deck having a main tail assembly pivotally connected to the rearward end thereof with the pivotal connection therebetween being located forwardly of the centerline of the rear axle of the trailer suspension system. The location of the hinge between the main deck and the main tail assembly, by being located forwardly of the centerline of the rear axle, provides a main tail having an increased length thereby providing a lower loading angle without increasing the overall length of the trailer. The forward end of the main deck is pivotally connected to the rearward end of an upper deck so that the main deck may be raised which further reduces the angle between the rearward end of the main deck and the forward end of the main tail for loading and unloading purposes.

6 Claims, 11 Drawing Sheets

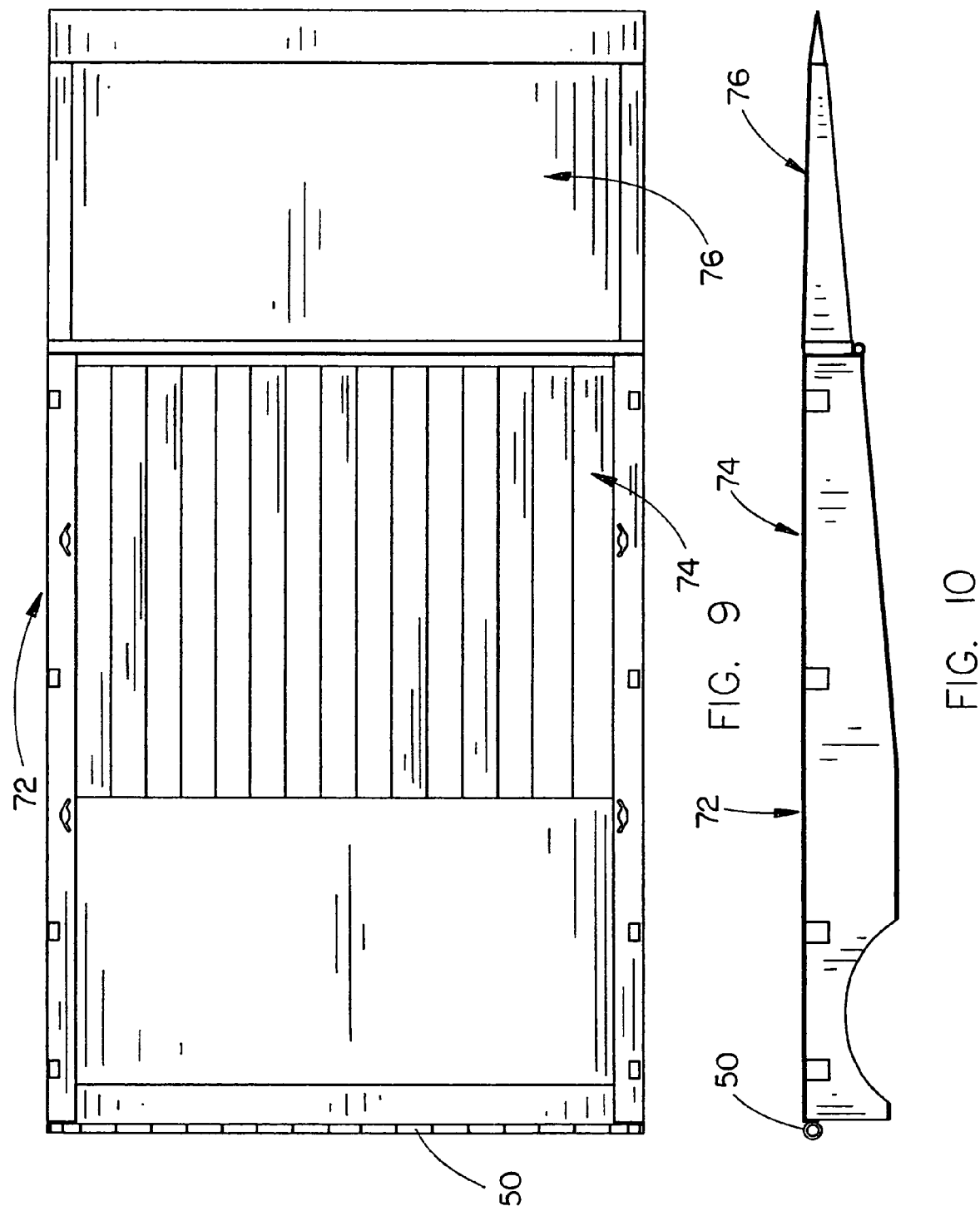

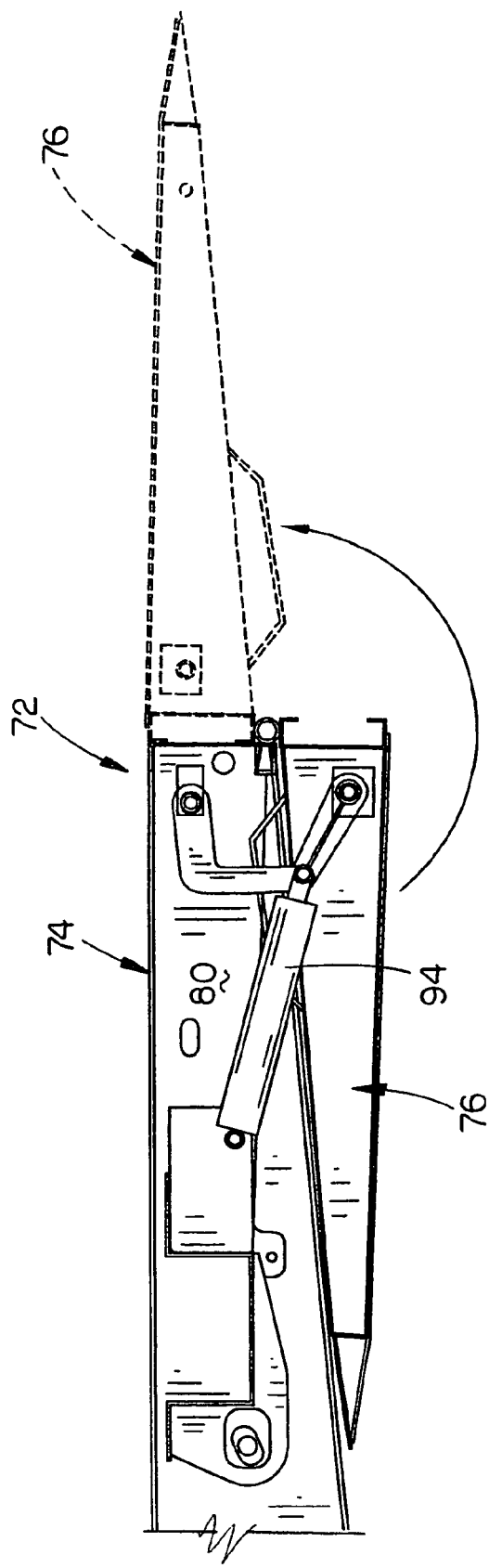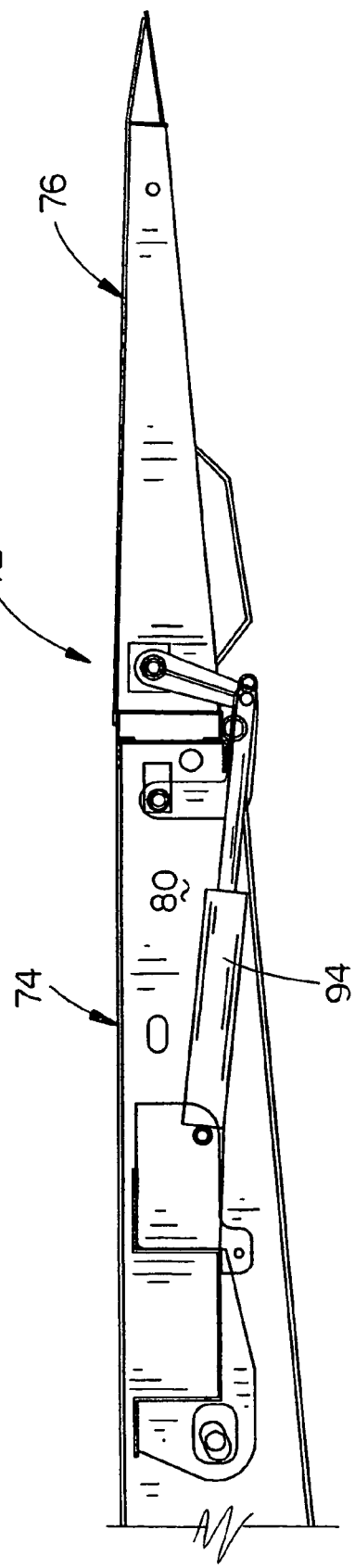

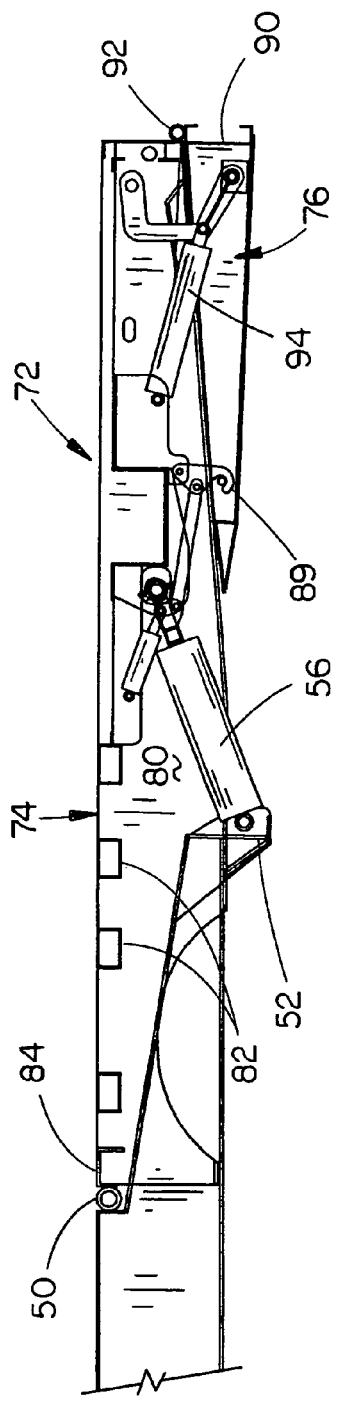
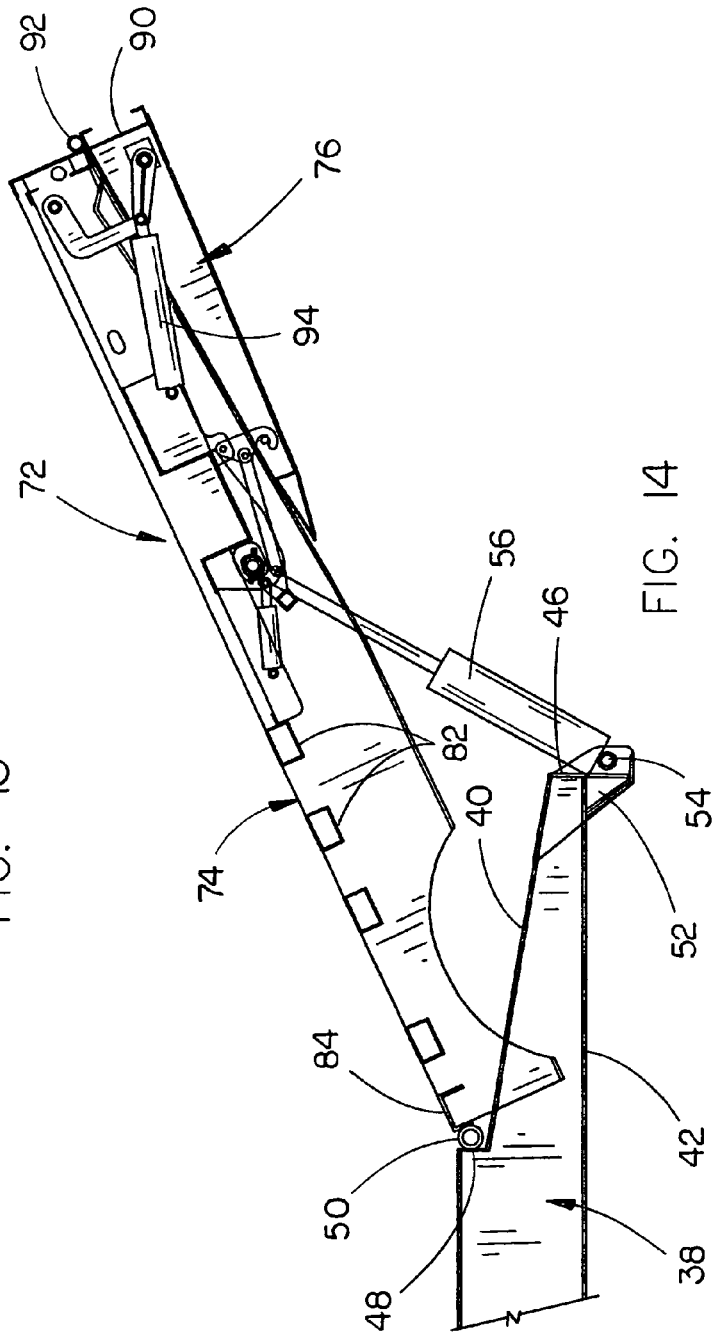

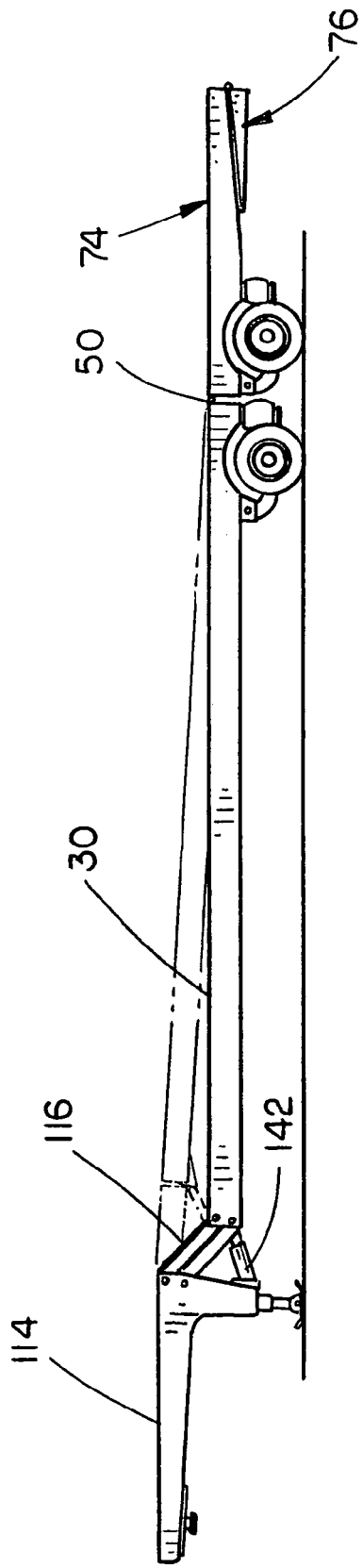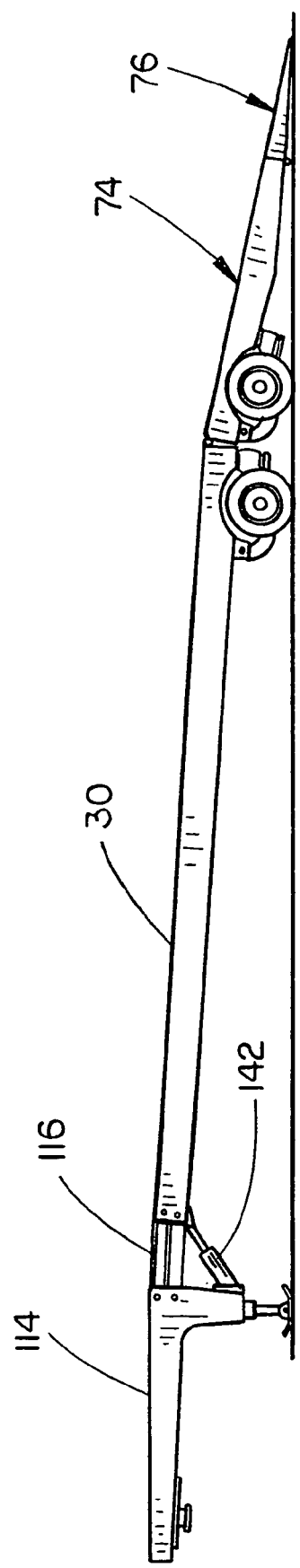
FIG. 17
FIG. 18

HYDRAULIC TAIL TRAILER

CROSS-REFERENCE TO RELATED APPLICATION

This is a continuation-in-part application of application Ser. No. 11/179,684 filed Jul. 11, 2005 now U.S. Pat. No. 7,547,178, entitled "HYDRAULIC TAIL TRAILER".

BACKGROUND OF THE INVENTION

1. Field of the Invention

This invention relates to a hydraulic tail trailer and more particularly to a hydraulic tail trailer wherein the main tail is hingedly connected to the trailer frame forward of the centerline of the rear axle of the suspension system thereby providing a lower load angle due to an increased tail length while maintaining the same overall trailer length. Further, the invention includes a main deck and an upper deck with means pivotally interconnecting the same. The combination of the pivoting main deck and the main tail decreases the angle between the main tail and the main deck for loading and unloading purposes.

2. Description of the Related Art

The trailer transportation of heavy or large farm and industrial equipment requires special loading ramps at the rear end of the trailer. In a typical hydraulic tail trailer of the prior art, a hinged tail ramp is pivotally or hingedly secured to the rear end of a main frame or main deck so that the rearward end of the main tail may be lowered into ground engagement. In some of the prior art trailers, the main tail's hinge point is located at the centerline of the rear axle of the suspension system or is located rearwardly of the rear axle of the suspension system. The location of the hinge at the centerline of the rear axle or rearwardly of the centerline of the rear axle results in the loading angle of the main tail being quite large. The large loading angle of the main tail also results in a significant angle being present between the main deck and the main tail deck which may cause the equipment being loaded or unloaded to "high center" at the juncture of the main deck and the main tail.

SUMMARY OF THE INVENTION

A hydraulic tail trailer is disclosed comprising a main frame having rearward and forward ends with the main frame including at least first and second longitudinally extending side frame members. Longitudinally extending first and second running gear beams having rearward and forward ends and upper and lower ends are operatively secured to the main frame and have rearwardly extending portions which extend rearwardly from the rearward end of the main frame. A suspension system is provided for supporting the rearward end of the trailer. The suspension system includes a front axle, having wheels secured to the opposite ends thereof, with the front axle being secured to the first and second running gear beams forwardly of the rear end of the main frame. The suspension system also includes a rear axle, having wheels secured to the opposite ends thereof. A rear suspension assembly operatively secures the rear axle to the first and second running gear beams rearwardly of the rearward end of the main frame. A main deck is mounted on the main frame with the rearward end of the main deck being positioned forwardly of the centerline of the rear axle. The trailer includes a hydraulically operated tail assembly having rearward and forward ends with the forward end of the tail assembly being pivotally secured to the main frame at the rearward end thereof. The pivotal connection of the forward end of the tail assembly to the rearward end of the main frame is positioned forwardly of the centerline of the rear axle.

The tail assembly includes a main tail and a flip tail. A pair of hydraulic cylinders interconnect the lower rearward ends of the running gear beams to the main tail for pivotally moving the main tail. A hydraulic cylinder pivotally interconnects the main tail and the flip tail to enable the flip tail to be pivotally moved with respect to the main tail.

Further, the forward end of the main deck is pivotally connected to an upper deck. The main deck may be pivotally moved with respect to the upper deck so that the angle between the rearward end of the main deck and the forward end of the main tail is further reduced when the main tail is deployed for loading and unloading purposes.

It is therefore a principal object of the invention to provide a hydraulic tail trailer wherein the main tail's hinge point is located forward of the centerline of the rear axle of the trailer.

Still another object of the invention is to provide a hydraulic tail trailer wherein the main tail's hinge point is located forwardly of the centerline of the rear axle to provide a lower load angle due to increased tail length while maintaining the same overall trailer length.

Still another object of the invention is to provide a hydraulic tail trailer including a main tail which has a lower load angle than prior art trailers due to its increased tail length without lengthening the overall length of the trailer.

Yet another object of the invention is to provide a hydraulic tail trailer which is durable in use and refined in appearance.

Still another object of the invention is to provide a hydraulic tail trailer which also includes structure which pivotally connects the forward end of the main deck to an upper deck so that the angle between the rearward end of the main deck and the forward end of the main tail is further reduced when the main tail is deployed for loading and unloading purposes.

These and other objects will be apparent to those skilled in the art.

BRIEF DESCRIPTION OF THE DRAWINGS

FIG. 9 is a top view of the tail assembly of the trailer of FIG. 1;

FIG. 10 is a side view of FIG. 9;

FIG. 11 is a side view of the rear end of the main tail of the trailer of FIG. 1 with the flip tail being in its stowed position;

FIG. 12 is a side view similar to FIG. 11 except that the flip tail has been pivoted to its operative position;

FIG. 13 is a side view of the main tail assembly and the rearward end of the frame of the trailer of FIG. 1 with the main tail assembly being in its transport position;

FIG. 14 is a side view similar to FIG. 13 except that the main tail assembly has been raised to enable the flip tail to be in a position so that it may be moved to its operative position;

FIG. 17 is a side view of the trailer of FIG. 16 with the broken lines illustrating the main deck in its raised position;

FIG. 18 is a side view of the trailer of FIG. 16 in its loading and unloading position;

DETAILED DESCRIPTION OF THE INVENTION

Figure 1:
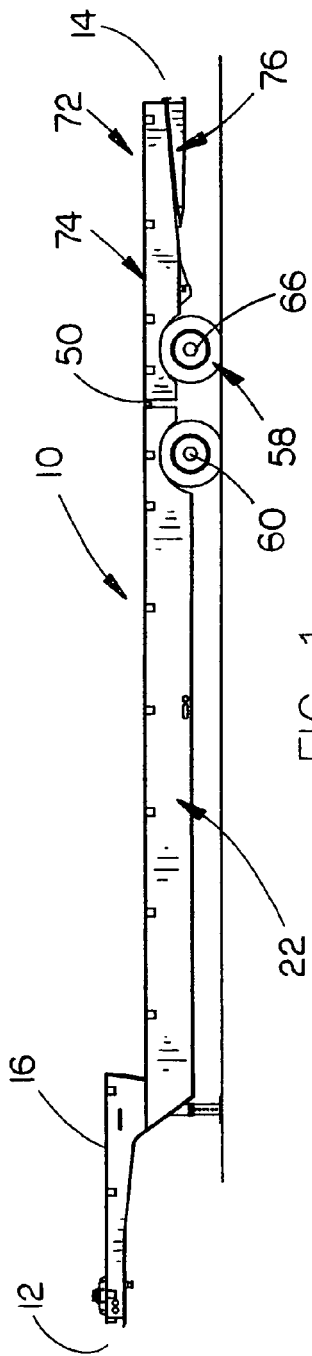
FIG. 1 is a side view of the trailer of the co-pending application in its transport position.

The hydraulic tail trailer of the co-pending application is illustrated in FIGS. 1-15 and is referred to generally by the reference numeral 10 and includes a forward end 12 and a rearward end 14. Trailer 10 may include a conventional upper deck section 16 and a hydraulically operated upper deck ramp 18 of conventional design. A king pin 20 is provided at the underside of the forward end of the trailer to enable the trailer to be connected to a prime mover such as a truck having a fifth wheel assembly mounted thereon.

Figure 3:
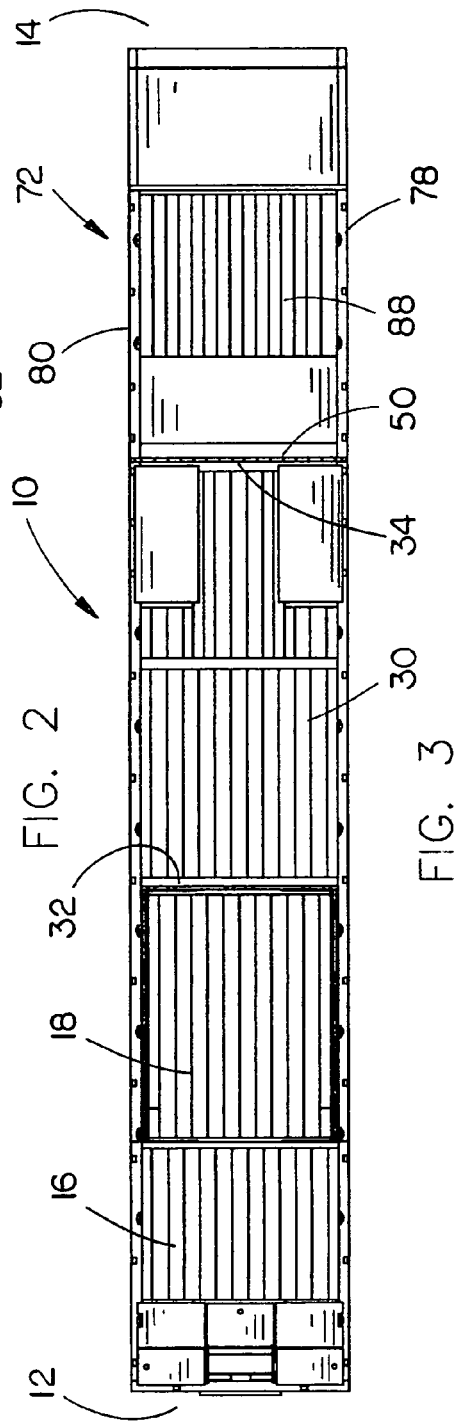
FIG. 3 is a top view of the trailer of FIG. 1.
Figure 7:
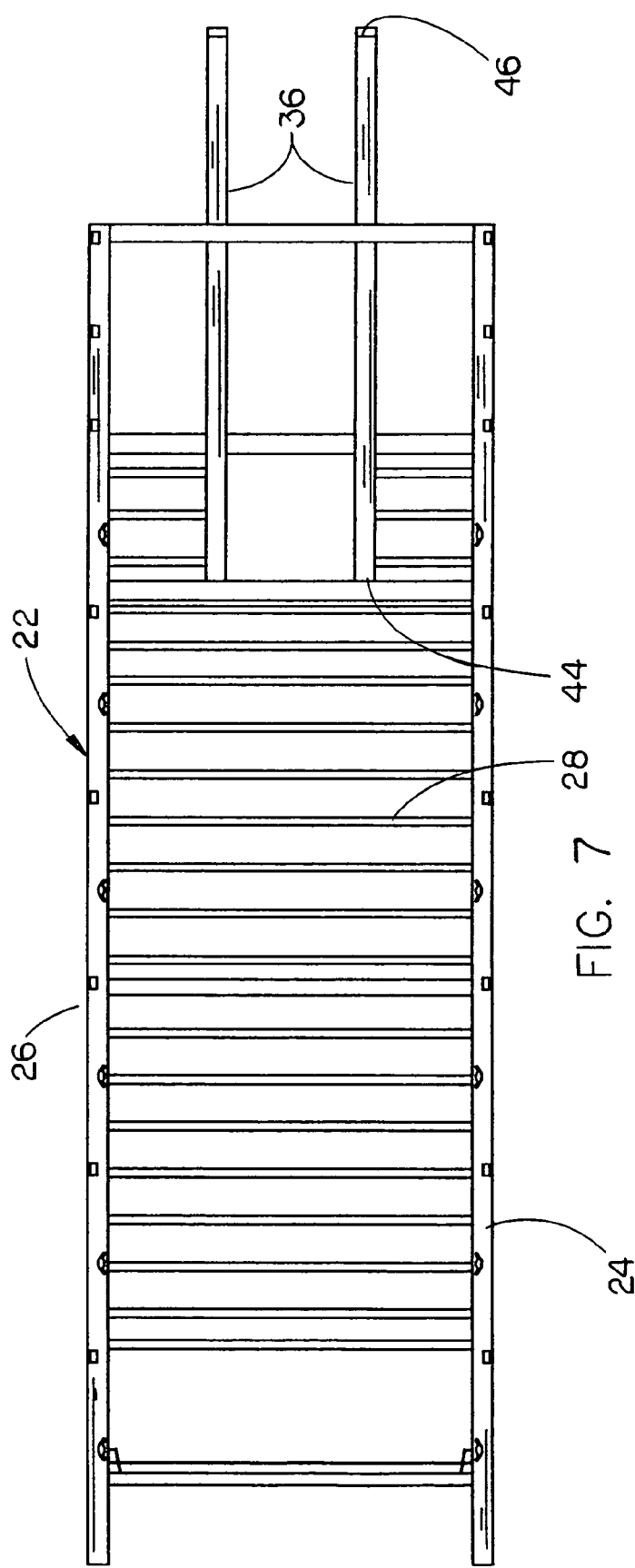
FIG. 7 is a top view of the main frame and running gear beams of the trailer of FIG. 1.
Figure 8:
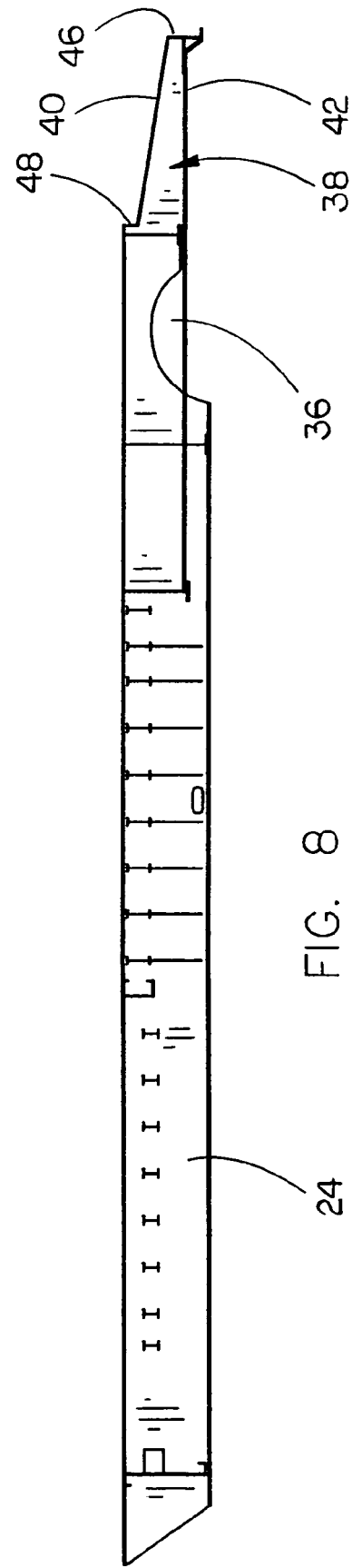
FIG. 8 is a side view of FIG. 7.

Trailer 10 includes a wheeled frame means 22 having first and second main frame beams 24 and 26 which are interconnected by cross-members 28 (FIG. 7). The numeral 30 refers to a main deck which is supported upon the main frame beams 24, 26 and the cross-members 28 with the main deck 30 having a forward end 32 and a rearward end 34 (FIG. 3). A pair of running gear beams 36 are secured to the frame means 22 between the main frame beams 24, 26 with each of the beams 36 having rearwardly extending portions 38 which have an upper end 40, lower end 42, forward end 44 and rearward end 46. As seen in FIG. 8, the beams 36 are provided with a shoulder or step 48 at the forward end of the rearwardly extending portion 38 to accommodate a hinge or tail ramp pivot 50 (FIG. 14). Each of the beams 36 has a hydraulic cylinder bracket 52 secured thereto which has a pin opening 54 formed therein below the lower end 42 of portion 38. The base end of a hydraulic cylinder 56 is pivotally secured to each of the brackets 52 by means of a pivot pin extending through opening 54. As seen in FIG. 14, the upper end 40 of portion 38 extends downwardly at an angle from its forward end to its rearward end.

Figure 15:
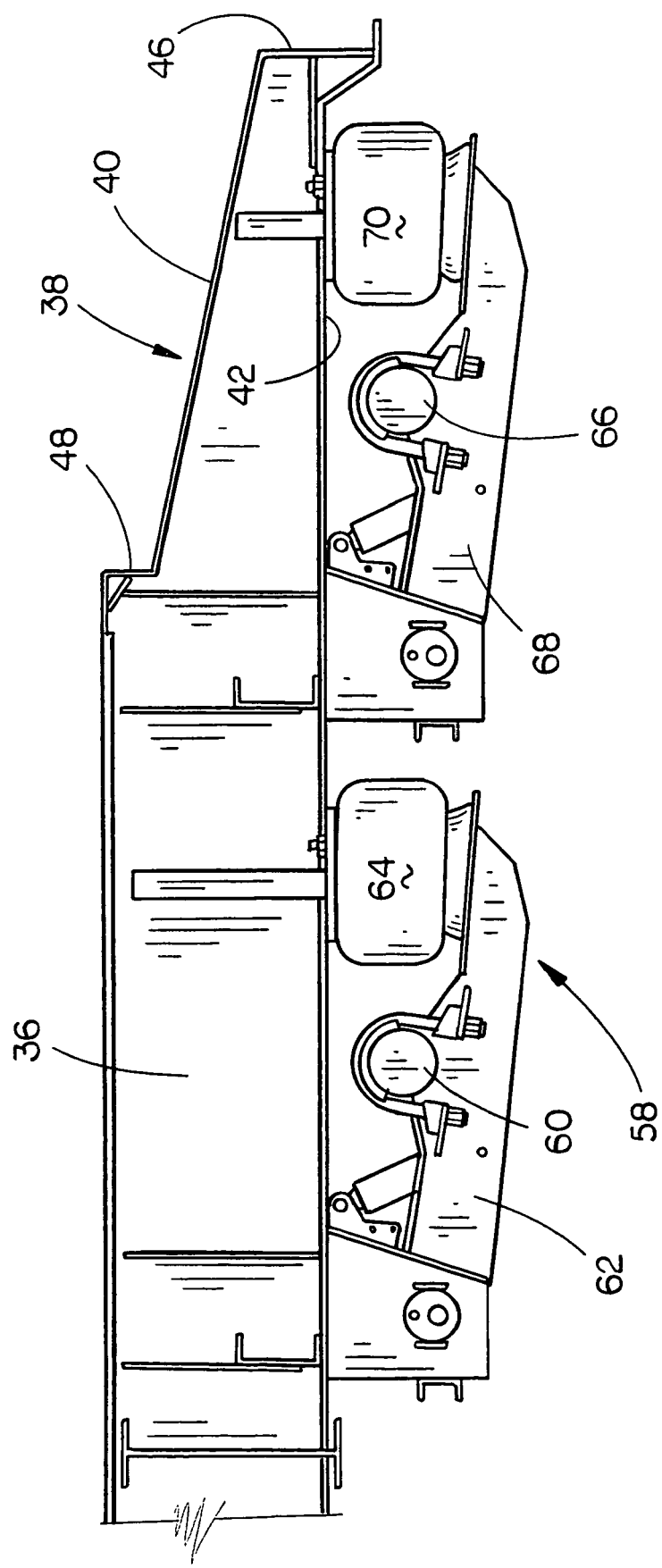
FIG. 15 is a partial side view of the suspension system of the trailer of FIG. 1.
Figure 16:
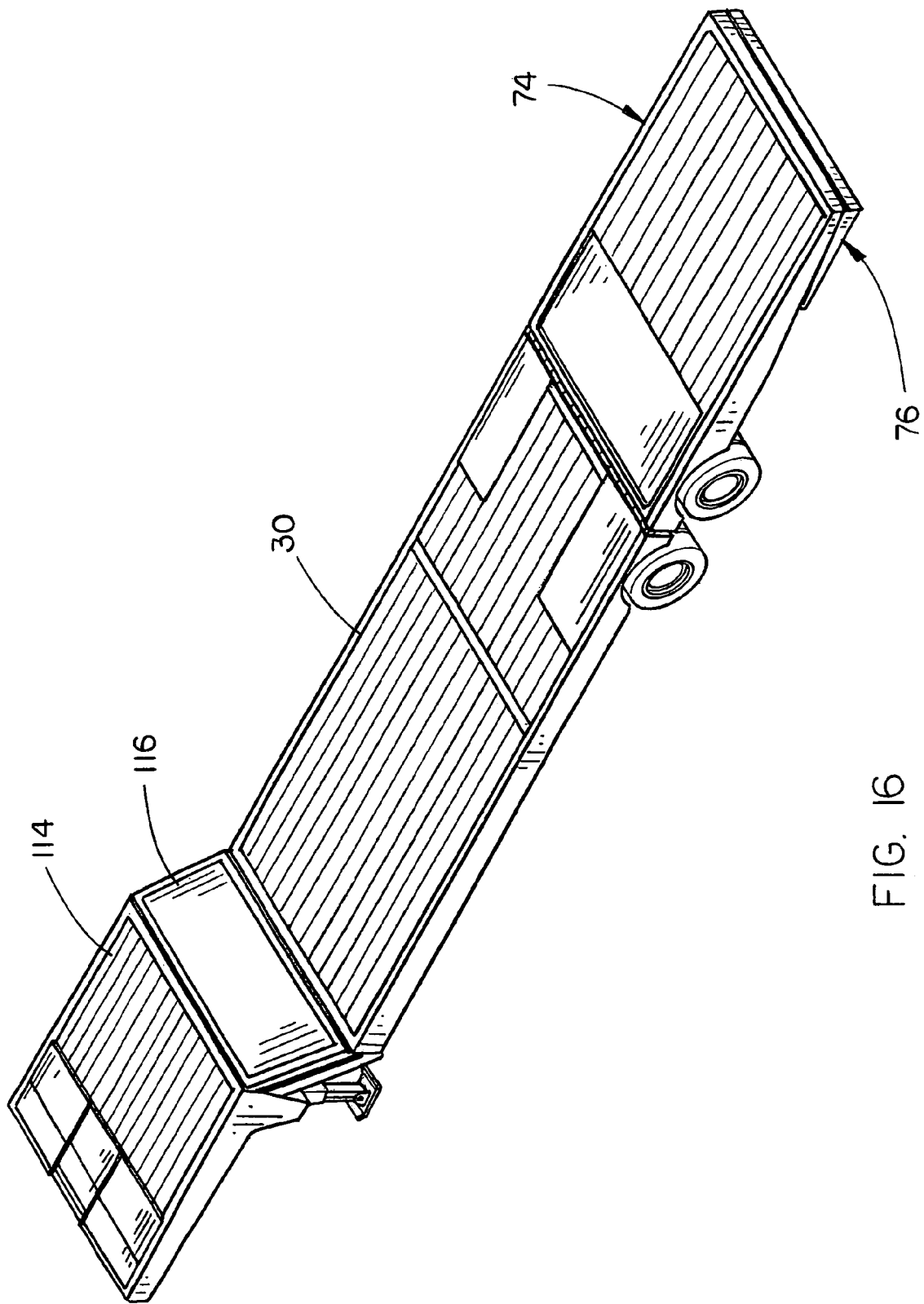
FIG. 16 is a rear perspective view of the trailer of this invention.

The numeral 58 refers to the suspension system of this trailer which is generally of conventional design (FIG. 15). Suspension system 58 includes a front axle 60 having one or more wheels mounted on the opposite ends thereof. Axle 60 is mounted on a pair of spaced-apart arms 62 which are pivotally secured to the running gear beams 36, respectively. An air bag 64 is positioned between the upper rearward end of each of the arms 62 and the associated running gear beam 36. Suspension system 58 also includes a rear axle 66 having one or more wheels mounted on the opposite ends thereof. Axle 66 is mounted on a pair of spaced-apart arms 68 which are pivotally secured to the running gear beams, respectively. An air bag 70 is positioned between the upper rearward end of each of the arms 68 and the associated running gear beam 36.

The numeral 72 refers to a hydraulic tail assembly which is pivotally secured to the rearward end of the frame means 22 and which includes a main tail 74 and a flip tail 76. Main tail 74 includes a pair of spaced-apart side frames or beams 78 and 80 having cross-members 82 secured thereto and extending therebetween. Frame or plate 84 is secured to and extends between the forward ends of beams 78 and 80. The forward end of main tail 74 is hingedly connected to the rearward end 34 of main deck 30 by hinge 50 which is hingedly secured to plate 84, to the rearward ends of main frame beams 24, 26 and to the running gear beams 36 adjacent shoulders 48.

Main tail 74 is provided with a deck 88 positioned on the cross-members 82 and which extends between side beams 78 and 80. The rod ends of hydraulic cylinders 56 are pivotally connected to the underside of the main tail 74 for moving the main tail 74 from a first load carrying position (FIGS. 1, 13) wherein the deck 88 of main tail 74 is parallel to main deck 30 to a second position wherein main tail 74 extends upwardly and rearwardly from main deck 30 (FIG. 14) to a third position wherein main tail 74 extends downwardly and rearwardly relative to main deck 30 (FIGS. 2, 4).

Flip tail 76 is hingedly connected at its forward end 90 to the lower rearward end of main tail 74 by hinge 92 (FIG. 13). A hydraulic cylinder 94 is pivotally connected to and extends between main tail 74 and flip tail 76 for pivotally moving flip tail 76 from a stowed position beneath the rearward end of main tail 74 (FIG. 13) to an operative position (FIGS. 2, 4, 5) so that the upper deck surface of flip tail 76 is parallel to and in alignment with the deck 88 of main tail 74. Generally conventional locking means 89 is provided for maintaining flip tail 76 in its stowed position (FIG. 13). Further, means is provided for maintaining main tail 74 in its load carrying position so that undue stress is not imposed on the hydraulic cylinders 56.

Figure 2:
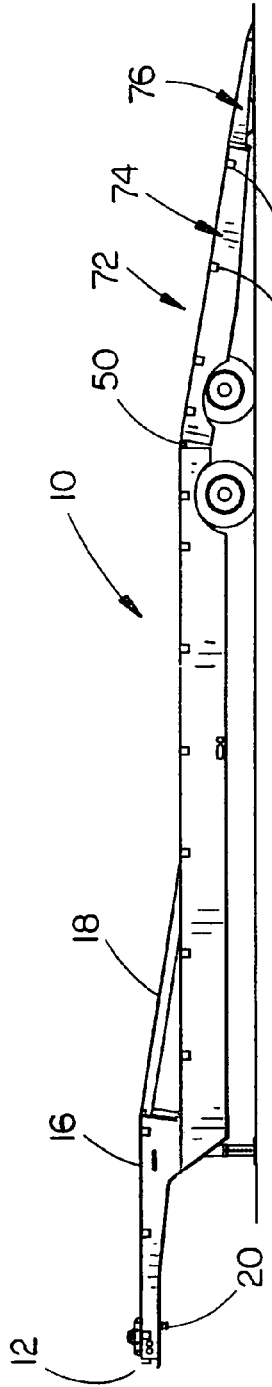
FIG. 2 is a side view of the trailer of FIG. 1 in its loading position.

Trailer 10 is illustrated in its transport position in FIG. 1. In the position of FIG. 1, flip tail 76 is in its stowed position beneath the rearward end of main tail 74 with the deck of main tail 74 being parallel with the main deck 30. As seen in FIG. 1, the pivot 50 is located approximately mid-way between axles 60 and 66. By moving the pivot 50 forwardly from that which is commonly used or known in the prior art, the length of the main tail 74 is increased, without increasing the overall trailer length. The location of the pivot 50 mid-way between the axles 60 and 66 reduces the loading angle of the main tail assembly 72 which enhances the loading of heavy and large equipment onto the trailer without that equipment "high centering" at the pivot 50.

Figure 4:
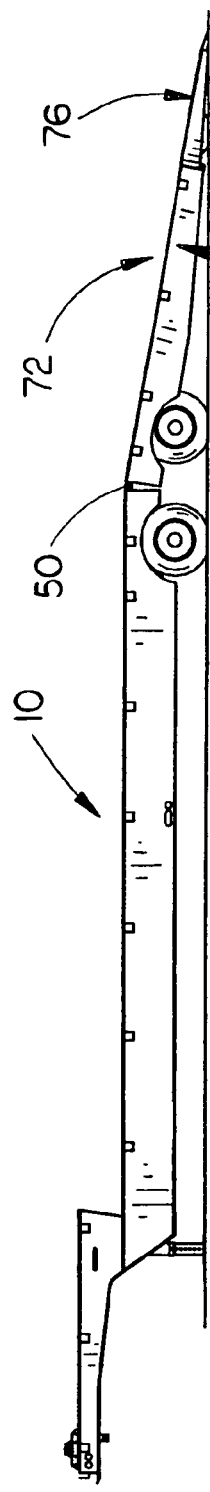
FIGS. 4-6 are side views of the trailer of FIG. 1 partially illustrating the manner in which the main tail and flip tail are moved as the tail is moved down from its loading position towards its transport position.
Figure 5:
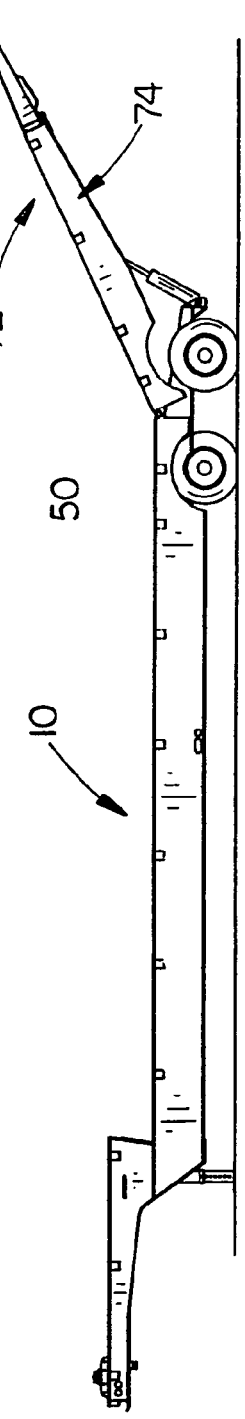
Figure 6:
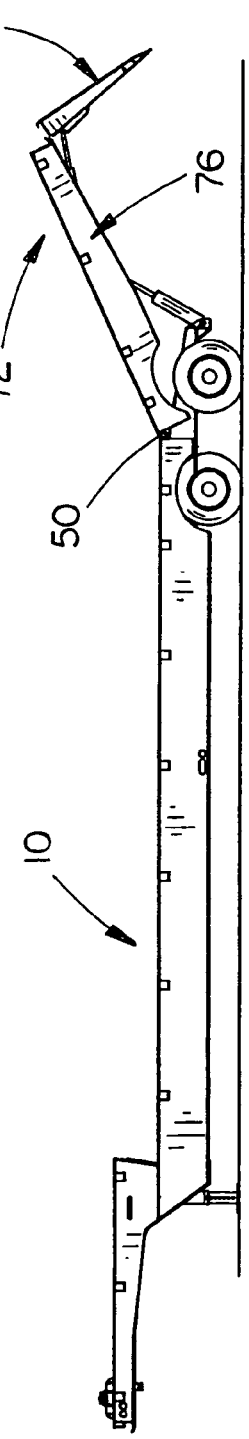

Assuming that the trailer is in the position of FIG. 1 and it is desired to move the main tail assembly to its loading position of FIG. 4, the hydraulic cylinders 56 are extended from the position of FIG. 13 to the position of FIG. 14 which causes the main tail assembly 72 to be moved upwardly from the parallel position. When the main tail assembly 72 has been raised to the position of FIG. 14, the hydraulic cylinder or cylinders 94 are extended from the position of FIG. 11 to the position of FIG. 12 so that the flip tail 76 is moved from its stowed position of FIG. 14 to the operative position illustrated by broken lines in FIG. 11 and illustrated by solid lines in FIG. 12. When the flip tail 76 has been pivoted so as to be parallel to main tail 74, the hydraulic cylinders 56 are retracted until the rearward end of the flip tail 76 moves into ground engagement, as illustrated in FIGS. 2 and 4.

When the main tail assembly is in the position of FIG. 4, equipment may be loaded onto the trailer or unloaded therefrom. The design of the pivot of the main tail assembly 72, by being located forwardly of the rear axle 66, provides a reduced loading angle as compared to that of the prior art as discussed hereinabove. When it is desired to move the main tail assembly 72 from the position of FIG. 4 to the transport position, hydraulic cylinders 56 are extended to raise the main tail assembly 72 to the position illustrated in FIG. 5. When the main tail assembly 72 is in the position of FIG. 5, the hydraulic cylinder or cylinders 94 are retracted from the position of FIG. 12 to the position of FIG. 11 so that flip tail 76 is stowed beneath the rearward end of main tail 74. When the flip tail 76 has been positioned as illustrated in FIG. 14, the hydraulic cylinders 56 are then retracted to lower the main tail assembly 72 until it is in the position of FIG. 1.

The positioning of the hinge 50 to a position forwardly of the rear axle 66 is made possible by providing the rearwardly and downwardly extending surfaces 40 on the beams 38 so that there will be sufficient clearance between the cross-members 82 and the rearward ends of the running gear beams 38. The fact that the base ends of the hydraulic cylinders 56 are pivoted to the beams 38 at a location below the lower end 42 thereof, also is a factor in providing sufficient clearance for the hydraulic cylinders 56.

Although it is preferred that hydraulic cylinders are utilized to raise and lower the main tail assembly with respect to the main frame, other mechanical means could also be employed. Further, although it is preferred that one or more hydraulic cylinders are utilized to operate the flip tail, other mechanical or manual means could also be employed.

Figure 19:
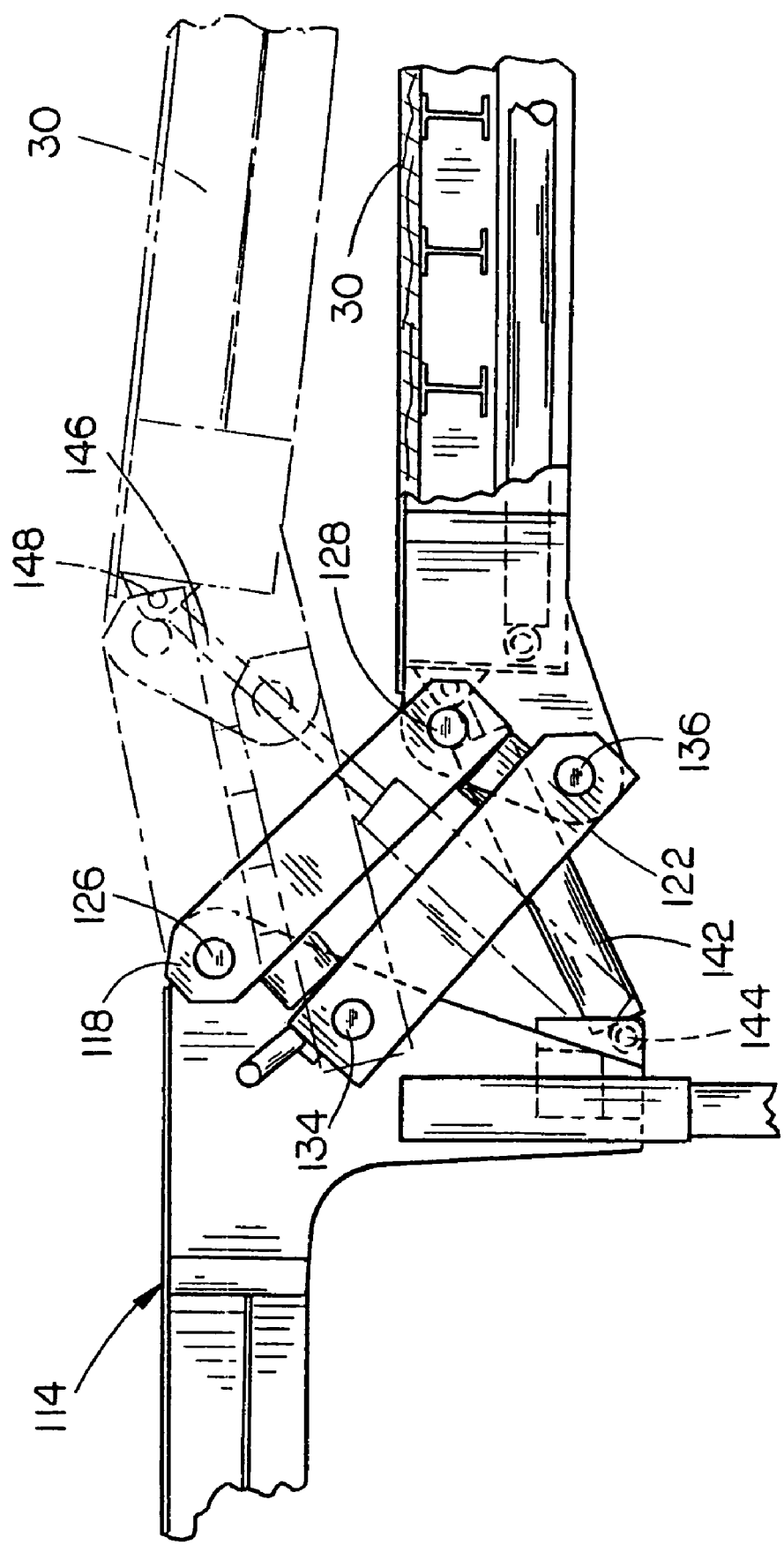
FIG. 19 is a partial side view of the pivotal connection of the upper and main decks with the broken lines illustrating the main deck in its raised position.
Figure 20:
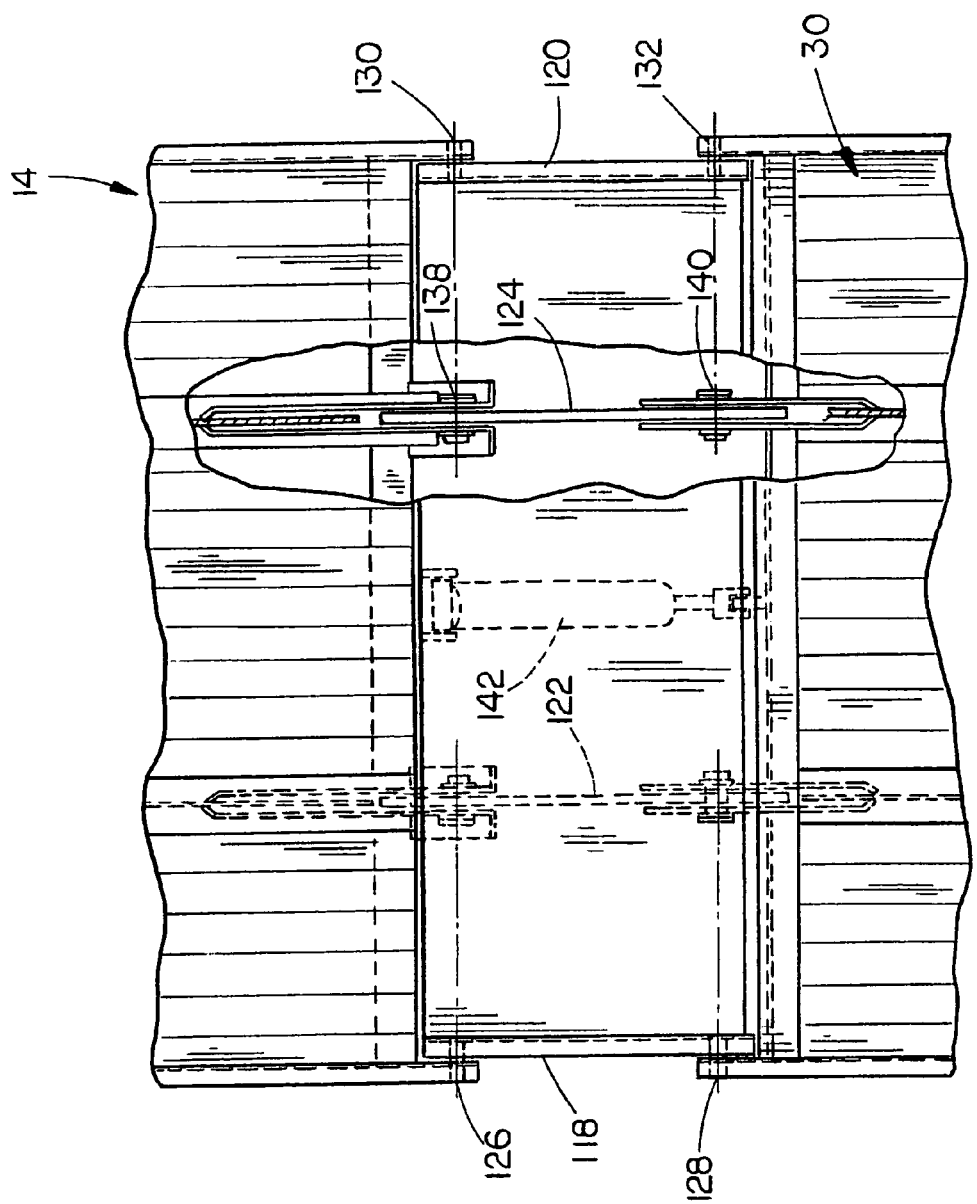
FIG. 20 is a partial top elevational view of the pivotal connection of the upper and main decks.

The foregoing has described the trailer structure of the co-pending application entitled "HYDRAULIC TAIL TRAILER". Although the hydraulic tail trailer of the co-pending application functions exceptionally well, it has been found that the angle between the rearward end of the main deck and the forward end of the main tail can be further reduced during loading and unloading operations by providing a pivotal connection between the forward end of the main deck and an upper deck. In FIGS. 16-19, the trailer shown therein is identical to the trailer of FIGS. 1-15 except for the pivotal connection between the main tail and the upper deck. Accordingly, the same reference numerals will be used in FIGS. 16-19 to identify corresponding structure. Deck ramp 116 pivotally interconnects the forward end of the main deck 30 to the rearward end of the upper deck 114, as illustrated in the drawings. More specifically, deck ramp 116 includes a pair of horizontally spaced-apart upper arms 118 and 120 positioned at the opposite sides thereof and a pair of horizontally spaced-apart lower arms 122 and 124 positioned inwardly thereof. Arm 118 is pivotally connected at its upper forward end to the rearward end of upper deck 114 at pivot point 126 while the lower rearward end thereof is pivotally connected to the upper forward end of the main deck 30 at pivot point 128. The upper forward end of arm 120 is pivotally connected to the rearward end of upper deck 114 at pivot point 130 while the lower rearward end of arm 120 is pivotally connected to the forward end of main deck 30 at pivot point 132. Arm 122 is pivotally connected at its upper forward end to upper deck 114 at pivot point 134 and is pivotally connected at its lower rearward end to the forward end of main deck 30 by pivot point 136. As best seen in FIG. 19, arms 118 and 120 are not perfectly parallel inasmuch as the vertical distance between the pivot points 126 and 134 is slightly greater than the vertical distance between pivot points 128 and 136.

The upper forward end of arm 124 is pivotally connected to upper deck 114 at pivot point 138 while the lower rearward end of arm 124 is pivotally connected to the forward end of main deck 30 at pivot point 140. Arms 122 and 124 are not perfectly parallel inasmuch as the vertical distance between pivot points 130 and 138 is greater than the vertical distance between pivot points 132 and 140.

Hydraulic cylinder 142 has its base end pivotally connected to upper deck 114 at 144 and has its rod 146 pivotally connected to the forward end of main deck 30 at 148. The extension of rod 146 from cylinder 142 causes the main deck 30 to be pivoted from the transport position illustrated by solid lines in FIG. 17 to the loading position illustrated in FIG. 18.

The multiple arm connection between the upper deck 114 and the main deck 30 causes the upper deck 114 to remain substantially fixed or horizontally disposed when the main deck 30 is pivotally moved from the solid line position of FIG. 17 to the position of FIG. 18. The fact that the main deck 30 may be pivoted from the solid line position of FIG. 17 to the position of FIG. 18 reduces the angle between the rearward end of main deck 30 an the main tail 74 for loading and unloading purposes thereby facilitating the loading and unloading of large equipment.

It can therefore be seen that a unique trailer has been provided which includes a main tail assembly having a loading length which is greater than that of the prior art with the increased loading length providing a lower loading angle without increasing the overall length of the trailer.

Thus it can be seen that the invention accomplishes at least all of its stated objectives.

We claim:

1. A trailer, comprising:
    a main frame having rearward and forward ends;
    said main frame including at least first and second longitudinally extending side frame members;
    longitudinally extending first and second running gear beams having rearward and forward ends and upper and lower ends, secured to said main frame in a fixed non-movable manner;
    each of said first and second running gear beams having rearwardly extending portions which extend rearwardly from said rearward end of said main frame;
    a front axle, having first and second ends;
    wheels secured to said first and second ends of said front axle;
    a front suspension assembly securing said front axle to said first and second running gear beams forwardly of the rearward end of said main frame in a single permanent longitudinally fixed position relative to one another;
    a rear axle, having first and second ends;
    wheels secured to said first and second ends of said rear axle;
    a rear suspension assembly securing said rear axle to said first and second running gear beams rearwardly of said rearward end of said main frame in a single permanent longitudinally fixed position relative to one another;
    a main deck mounted on said main frame and having rearward and forward ends;
    an upper deck frame, having rearward and forward ends, positioned forwardly of said main frame;
    an upper deck, having rearward and forward ends, on said upper deck frame;
    a deck ramp, having rearward and forward ends, pivotally interconnecting said forward end of said main frame and the rearward end of said upper deck frame;
    said main deck being pivotally movable between loading/unloading and transport positions with respect to said upper deck;
    said rearward end of said main deck being positioned forwardly of the centerline of said rear axle;
    a hydraulically operated tail assembly, having rearward and forward ends;
    said forward end of said tail assembly being pivotally secured to said main frame at the rearward end thereof;
    the pivotal connection of said forward end of said tail assembly to said rearward end of said main frame being positioned forwardly of the centerline of said rear axle;
    said upper ends of said rearwardly extending portions of said first and second running gear beams extending downwardly and rearwardly from said main frame so that the upper rearward ends of said first and second running gear beams are located in a plane below the upper forward ends of said rearwardly extending portions;

a first hydraulic cylinder, having upper and lower ends, pivotally secured at its lower end to the lower rearward end of said first running gear beam and which is pivotally secured at its upper end to said tail assembly;

a second hydraulic cylinder, having upper and lower ends, pivotally secured to the lower rearward end of said second running gear beam and which is pivotally secured at its upper end to said tail assembly.

2. The hydraulic tail trailer of claim 1 wherein the pivotal connections of said first and second hydraulic cylinders to said first and second running gear beams are below the said lower ends thereof.

3. The hydraulic tail trailer of claim 1 wherein said tail assembly includes a main tail, having a rearward end, a forward end, an upper end, and a lower and further includes a flip tail, having a rearward end, a forward end, an upper end, and a lower end; said forward end of said flip tail being pivotally secured to said rearward end of said main tail; and wherein a hydraulic cylinder is pivotally secured to said main tail and said flip tail for pivotally moving said flip tail from a stowed position beneath said main tail to an operative position.

4. The hydraulic tail trailer of claim 3 wherein said first and second hydraulic cylinders are capable of pivotally moving said tail assembly between a first position wherein said main tail is parallel with said main deck, to a second upwardly and rearwardly extending position with respect to said main deck and to a third downwardly and rearwardly inclined extending position with respect to said main deck.

5. A tail trailer, comprising:
a wheeled frame means including a main frame and an upper deck frame;
an upper deck on said upper deck frame having rearward and forward ends;
said forward end of said main frame being pivotally connected to said rearward end of said upper deck to permit said main frame to be pivotally moved between an unloading/loading position to a transport position;
a main deck on said main frame having rearward and forward ends;
said main frame including at least first and second longitudinally extending side frame members;
longitudinally extending first and second running gear beams having rearward and forward ends and upper and lower ends, secured to said main frame in a fixed non-movable manner;

each of said first and second running gear beams having rearwardly extending portions which extend rearwardly from said rearward end of said main frame;

a front axle, having first and second ends;

wheels secured to said first and second ends of said front axle;

a front suspension assembly securing said front axle to said first and second running gear beams forwardly of the rearward end of said main frame in a single permanent longitudinally fixed position relative to one another;

a rear axle, having first and second ends;

wheels secured to said first and second ends of said rear axle;

a rear suspension assembly securing said rear axle to said first and second running gear beams rearwardly of said rearward end of said main frame in a single permanent longitudinally fixed position relative to one another;

said rearward end of said main deck being positioned forwardly of the centerline of said rear axle;

a tail assembly, having rearward and forward ends;

said forward end of said tail assembly being pivotally secured to said main frame at the rearward end thereof;

the pivotal connection of said forward end of said tail assembly to said rearward end of said main frame being positioned at the centerline of said rear axle or forwardly thereof;

said upper ends of said rearwardly extending portions of said first and second running gear beams extend downwardly and rearwardly from said main frame so that the upper rearward ends of said first and second running gear beams are located in a plane below the upper forward ends of said rearwardly extending portions;

a first hydraulic cylinder, having upper and lower ends, pivotally secured at its lower end to the lower rearward end of said first running gear beam and which is pivotally secured at its upper end to said tail assembly;

and a second hydraulic cylinder, having upper and lower ends, pivotally secured to the lower rearward end of said second running gear beam and which is pivotally secured at its upper end to said tail assembly.

6. The tail trailer of claim 5 wherein the pivotal connections of said first and second hydraulic cylinders to said first and second running gear beams are below the said lower ends thereof.

* * * * *